United States Patent
Kim et al.

(10) Patent No.: US 8,952,941 B2
(45) Date of Patent: Feb. 10, 2015

(54) ENERGY-EFFICIENT DISPLAY APPARATUS WITH OBJECT-SENSING CAPABILITY

(75) Inventors: JoongHyun Kim, Asan-si (KR); Hyungguel Kim, Seongnam-si (KR); Taeseok Jang, Seoul (KR); Namheon Kim, Yongin-si (KR); Jinsung Choi, Cheonan-si (KR); Ho-young Kim, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 896 days.

(21) Appl. No.: 12/885,328

(22) Filed: Sep. 17, 2010

(65) Prior Publication Data

US 2011/0115757 A1   May 19, 2011

(30) Foreign Application Priority Data

Nov. 16, 2009   (KR) .................. 10-2009-0110465

(51) Int. Cl.
- *G06F 3/038* (2013.01)
- *G06F 3/041* (2006.01)
- *G06F 1/32* (2006.01)
- *G06F 3/042* (2006.01)

(52) U.S. Cl.
CPC .............. *G06F 1/3262* (2013.01); *G06F 3/042* (2013.01); *G06F 3/0412* (2013.01)
USPC ......................................... 345/204; 345/173

(58) Field of Classification Search
CPC ........ G02F 1/13357; G09G 3/36; G09G 3/34; G08B 21/00; G06F 3/042
USPC ........................................... 345/102, 204, 76
See application file for complete search history.

(56) References Cited

U.S. PATENT DOCUMENTS

| | | |
|---|---|---|
| 2003/0122771 A1 | 7/2003 | Sumiyoshi et al. |
| 2007/0001936 A1* | 1/2007 | Kawakami et al. ............. 345/76 |
| 2008/0204397 A1* | 8/2008 | Jang et al. ..................... 345/102 |
| 2009/0073107 A1 | 3/2009 | Chen et al. |
| 2009/0141004 A1 | 6/2009 | Yamazaki |
| 2010/0085329 A1* | 4/2010 | Tseng et al. .................. 345/175 |

FOREIGN PATENT DOCUMENTS

| | | |
|---|---|---|
| CN | 101206550 | 6/2008 |
| JP | S61-170126 | 7/1986 |
| JP | 2006-127212 | 5/2006 |
| JP | 2006-301864 | 11/2006 |
| JP | 2008-251020 | 10/2008 |
| JP | 2009-032005 | 2/2009 |
| JP | 2009-128835 | 6/2009 |
| KR | 10-2009-0006543 A | 1/2009 |

\* cited by examiner

*Primary Examiner* — Michael Faragalla
(74) *Attorney, Agent, or Firm* — Innovation Counsel LLP

(57) ABSTRACT

A display device capable of accurately sensing object presence at lower power consumption is presented, as well as a method of driving the display device. The display device includes a sensing circuit that detects the presence of an object by sensing radiation, and a radiation source array that provides radiation to the sensing circuit. First signals are provided to the scan lines of the sensing circuit, sequentially activating the sensors during a frame period. Second signals are provided to a radiation source array to selectively activate different portions of the radiation source array. The first and second signals are synchronized in their timing such that the portion of the radiation source array that supplies radiation to the activated sensors are turned on.

33 Claims, 14 Drawing Sheets

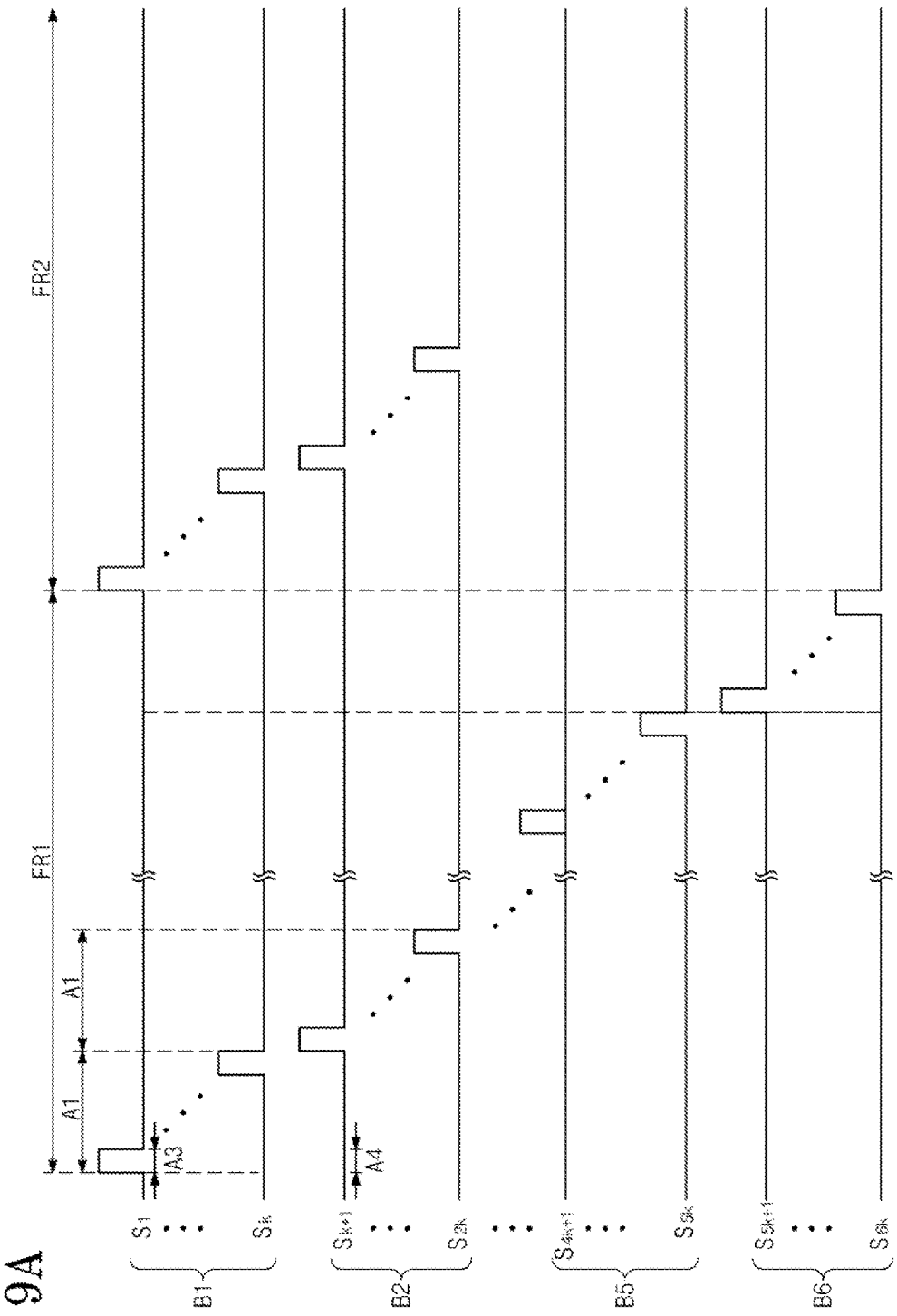

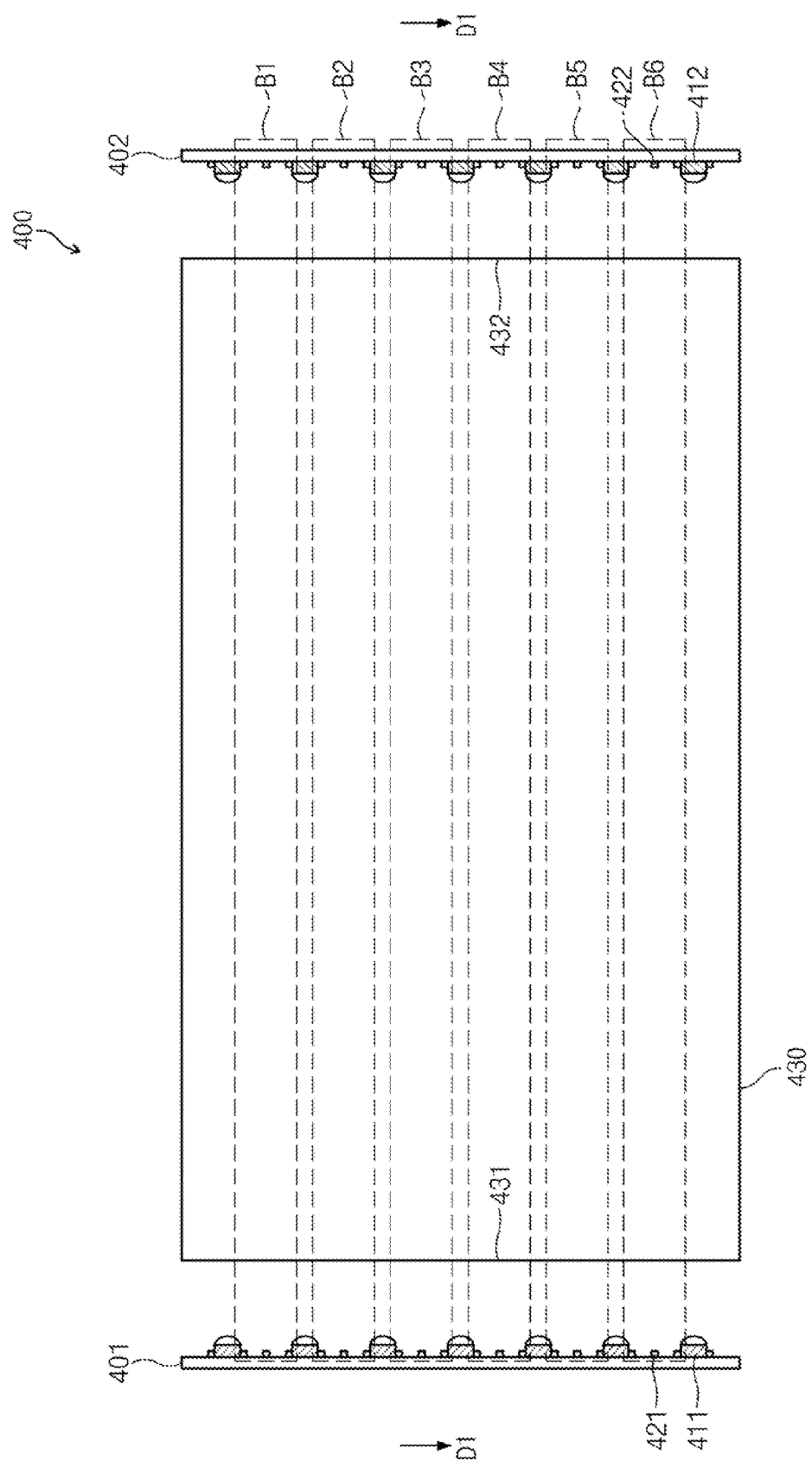

ENERGY-EFFICIENT DISPLAY APPARATUS WITH OBJECT-SENSING CAPABILITY

CROSS-REFERENCE TO RELATED APPLICATION

This application relies for priority upon Korean Patent Application No. 2009-110465 filed on Nov. 16, 2009, the content of which is herein incorporated by reference in its entirety.

FIELD OF INVENTION

The present invention refers generally to a display device and more particularly to an object-sensing (e.g., touch-sensing) display device.

BACKGROUND

An object-sensing device is a device capable of sensing the presence of an object, and sometimes determines the location of the object on the device. Incorporation of object-sensing capability into display devices is becoming increasingly desirable, as it allows the display device itself to also be used as a user input device, eliminating the need for cumbersome components such as keyboards, keypads, and mouse. Using an object-sensing display device, a user can, for example, touch images of buttons on the display to make a selection or type a word. Object-sensing display devices can be useful for applications such as automatic telling machines (ATMs), mobile/cellular phones, and personal digital assistants (PDAs).

As the object-sensing capability requires extra components, adding the object-sensing capability usually results in higher power consumption for the display device. Both from a practical standpoint and an environmental standpoint, object-sensing display apparatuses that can operate at reduced power consumption are desirable.

SUMMARY

In one aspect, the invention is a method for driving a display device that is capable of sensing object presence (e.g., a touch). The method entails providing first signals to a sensing circuit that detects a presence of an object by sensing radiation, wherein the sensing circuit includes scan lines for receiving the first signals. Second signals are provided to a radiation source array that provides radiation to the sensing circuit, wherein the second signals selectively activate radiation sources in the radiation source array. The timings of the first and second signals are synchronized so that radiation is provided to a portion of the sensing circuit receiving the first signals.

In another aspect, the invention is a method for driving a display device that is capable of object detection. An array of infrared radiation sources are divided into a plurality of groups. The plurality of groups is activated sequentially one at a time.

In yet another aspect, the invention is a display device that includes a sensor array and a radiation source array coupled to each other. The sensor array includes sensing circuits, wherein each of the sensing circuits includes a scan line and a sensing transistor that outputs a detection signal when an object is detected and the scan line is receiving a first signal, and wherein the sensing circuits are sequentially activated by a series of first signals. The radiation source array emits radiation that is used by the sensing transistor to detect the object, and the radiation sources in the radiation source array are activated by second signals that are synchronized with the first signals.

In yet another aspect, the invention is a display device that includes a sensor array and a radiation source array coupled to each other. The sensor array includes sensing circuits, wherein each of the sensing circuits includes a scan line and a sensing transistor that outputs a detection signal when an object is detected and the scan line is receiving a first signal, and wherein the sensing circuits are sequentially activated by a series of first signals. The radiation source array emits radiation that is used by the sensing transistor to detect the object, and the radiation sources in the radiation source array are activated by second signals that are synchronized with the first signals.

BRIEF DESCRIPTION OF THE DRAWINGS

FIG. 9A is a timing diagram showing the synchronization between the scan signals to a sensing circuit and activation of sub-groups of radiation sources.

FIG. 12 is a plan view showing the backlight unit of FIG. 11.

DETAILED DESCRIPTION

Generally, one way for a display device to detect the presence of an object is by using sensing circuits that have scan lines laid across the display panel. When an object touches or otherwise activates a point on the display panel, the scan line(s) that is closest to that point will indicate the presence and location of the object by generating a signal. The signal on the scan line(s) may be generated, for example, by receiving radiation that is reflected by the object. In that case, radiation sources are often incorporated into the display device to provide the radiation that can be reflected by the object and sensed by the sensing circuit. Typically, the radiation sources are turned on continuously to make sure the object will be detected whenever it is present.

The invention reduces power consumption dramatically while allowing the object detection to be performed at high accuracy by taking advantage of the fact that the scan lines that detect the radiation reflected by an object may not all be turned on continuously. For example, the scan lines are frequently "scanned" sequentially from one end of the panel to the other. The scanning frequency is high relative to the typical duration that an object is present (e.g., duration of a human touch) so that even though not all the scan lines are turned on continuously, there is no concern for a touch or an object presence being missed. The invention reduces power consumption by dividing the radiation sources into multiple groups and selectively turning on certain groups of radiation sources as needed, instead of keeping all the radiation sources turned on continuously. For example, the radiation sources near the scan lines that are activated may be turned on because an object is sensed by an activated scan line, while others remain turned off. This way, any "wasting" of power from turning on the radiation sources that are not near activated scan lines may be eliminated. The structure of the display device with this power-efficient object-sensing capability and the method of detection will now be described.

A "light source," as used herein, emits visible light. A "radiation source" emits radiation that is used for object detection, wherein the radiation may be visible (e.g., white light), invisible (e.g., infrared), or a combination of the two.

Figure 1:
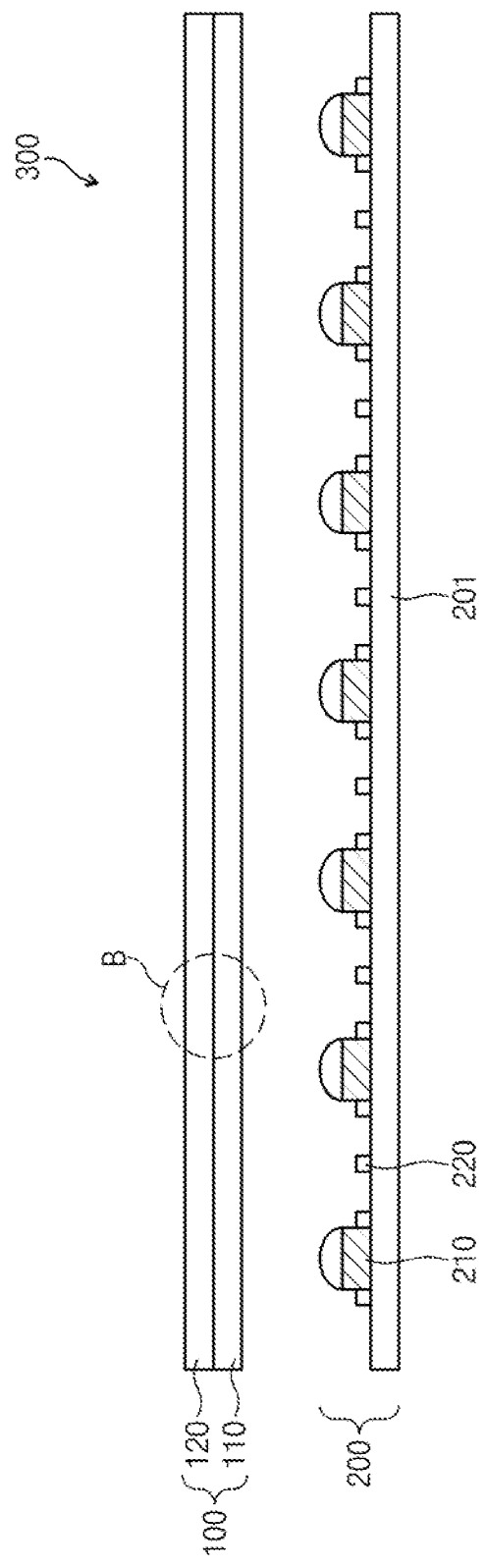
FIG. 1 is a sectional view showing an exemplary embodiment of a display apparatus having a light source and a radiation source.

FIG. 1 is a sectional view of a display apparatus according to one embodiment of the present invention. As shown, a display apparatus 300 includes a display panel 100 and a backlight unit 200 illuminating the display panel 100. The display panel 100 includes a lower substrate 110, an upper substrate 120 facing the lower substrate 110, and a liquid crystal layer 125 interposed between the upper and lower substrates 120 and 110.

The backlight unit 200 includes a circuit substrate 201 provided below the display panel 100, a plurality of light sources 210 (see FIG. 1) mounted on the circuit substrate 201 to output a white light L1, and a plurality of radiation sources 220 (see FIG. 1) mounted on the circuit substrate 201 to output an infrared ray L2. In the embodiment of FIG. 1, the light source 210 and radiation source 220 are arranged in an alternating manner—at least one radiation source 220 may be provided between adjacent light sources 210. The light sources 210 and radiation sources 220 may include a light emitting diode. As will be explained in more detail below, the light sources 210 are useful for image display and the radiation sources 220 are useful for object detection.

Figure 2:
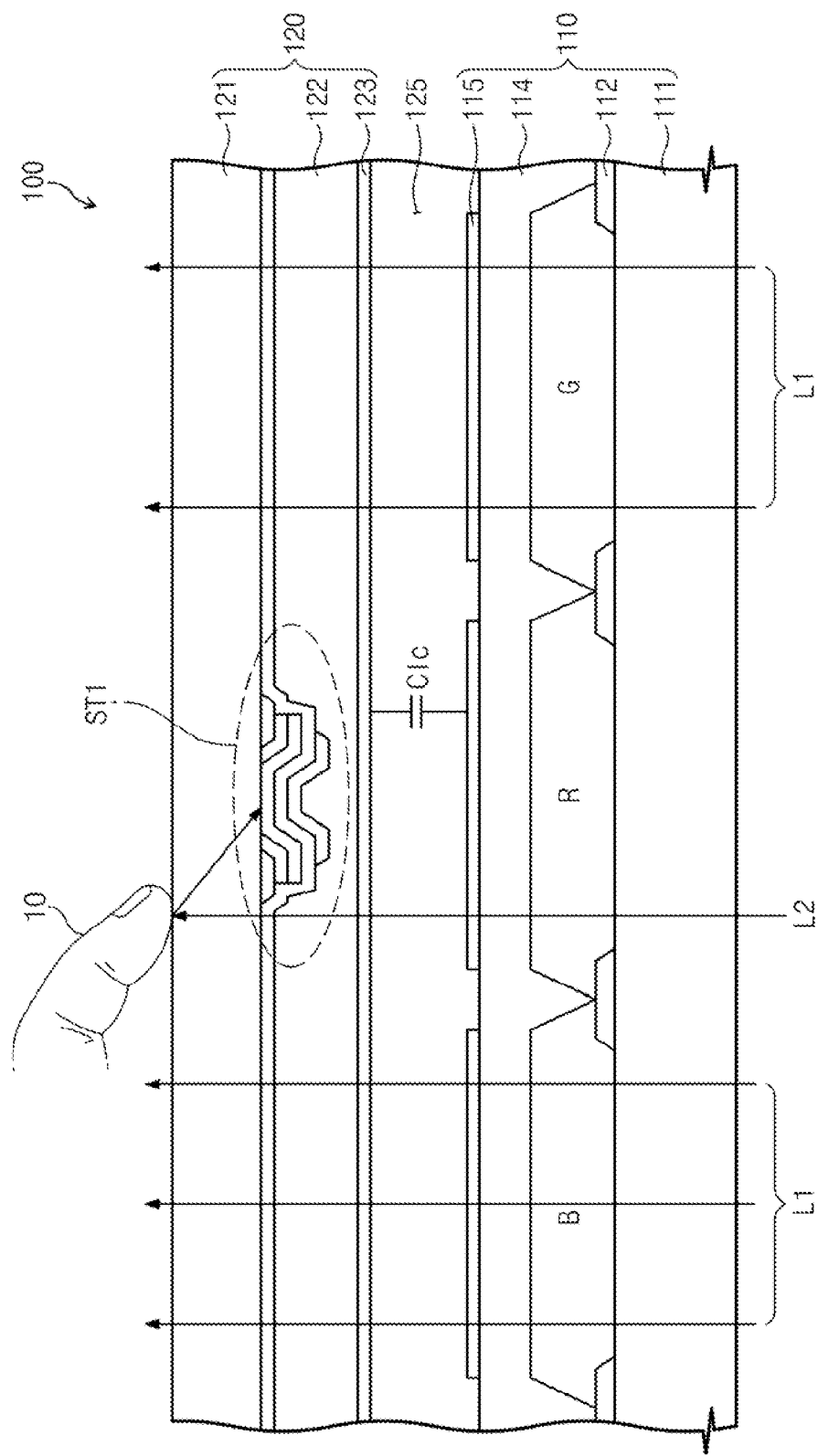
FIG. 2 is an enlarged view of a portion B of FIG. 1.

FIG. 2 is an enlarged view of a portion B of FIG. 1. As shown in FIG. 2, the lower substrate 110 includes a first base substrate 111 and a plurality of pixels arranged on the first base substrate 111. Each pixel includes one of red, green, and blue color pixels R, G, and B, and a pixel electrode 115 provided on the one color pixel. Each pixel may further include a thin film transistor in addition to the color pixels R,G, and B and the pixel electrode 115. The structure of each pixel will be described in detail with reference to FIG. 3.

A black matrix 112 is arranged between the red, green, and blue color pixels R, G, and B. The red, green, and blue color pixels R, G, and B are covered by an organic insulating layer 114. The pixel electrode 115 is provided on the organic insulating layer 114.

The upper substrate 120 includes a second base substrate 121 facing the first base substrate 111 and a plurality of sensors SN (see FIG. 3) provided on a bottom surface of the second base substrate 121 facing the lower substrate 110. Each sensor SN includes a sensing device (hereinafter, refer to as a sensing transistor ST1). For example, the sensing transistor ST1 may include an amorphous silicon transistor. The upper substrate 120 further includes an insulating layer 122 that covers the sensors SN and a common electrode 123 provided on the insulating layer 122 to face the pixel electrode 115. A liquid crystal capacitor Clc is formed by the pixel electrode 115, the common electrode 123, and the liquid crystal layer 125.

Although FIG. 2 shows that the red, green, and blue color pixels R,G, and B are provided in the lower substrate 110, the color pixels R,G, and B may be provided in the upper substrate 120 in some embodiments.

As shown, the white light L1 output from the light sources 210 is supplied to the display panel 100, and the supplied white light L1 passes through the liquid crystal layer 125. Light transmittance of the liquid crystal layer 125 is controlled by an electric field formed between the pixel electrode 115 and the common electrode 123. The display panel 100 controls the transmittance of the white light L1 by the liquid crystal layer 125, thereby displaying an image having desired gray scales.

The infrared ray L2 emitted from the radiation sources 220 is supplied to the display panel 100, and the supplied infrared ray L2 passes through the display panel 100. Since the infrared ray L2 is not visible to a user, the infrared ray L2 does not affect the image displayed on the display panel 100 as perceived by the user. A portion of the infrared ray L2 emitted from the radiation sources 220 is reflected by the layers in the display panel 100. The portion of the infrared ray L2 that is not reflected may pass through the display panel 100 and get radiated outside of the display panel 100. If an object 10 (for example, a finger of a user) is on the display panel 100, the infrared ray L2 reflects off the object 10.

The infrared ray L2 that has been reflected by the object 10 may be sensed through the sensing transistor ST1. In other words, if the reflected infrared ray L2 is supplied to the sensing transistor ST1, the sensing transistor ST1 outputs a signal that indicates an amount of the reflected infrared ray L2. The sensing transistor ST1 may include an amorphous silicon layer. The display apparatus 300 determines the location of an object on its surface by using the signal generated from the touch.

When the sensing transistor ST1 is provided on the upper substrate 120, the distance between the object 10 and the sensing transistor ST1 is shorter than it would be if the sensing transistor ST1 were provided on the lower substrate 110. Accordingly, the sensitivity of the sensing transistor ST1 may be improved, and the touch point may be accurately detected. It may be desirable to form the sensing transistor ST1 to overlap the black matrix 112, thereby avoiding decreasing the aperture ratio of the display panel 100.

Although the sensors (including the sensing transistor ST1) are embedded in the display panel 100 in the embodiment of FIG. 2, a touch panel (not shown) including the sensors may be provided at an upper portion of the display panel 100 in other embodiments. Alternatively, the sensing transistor ST1 may be provided on the lower substrate 110 in some embodiments.

Figure 3:
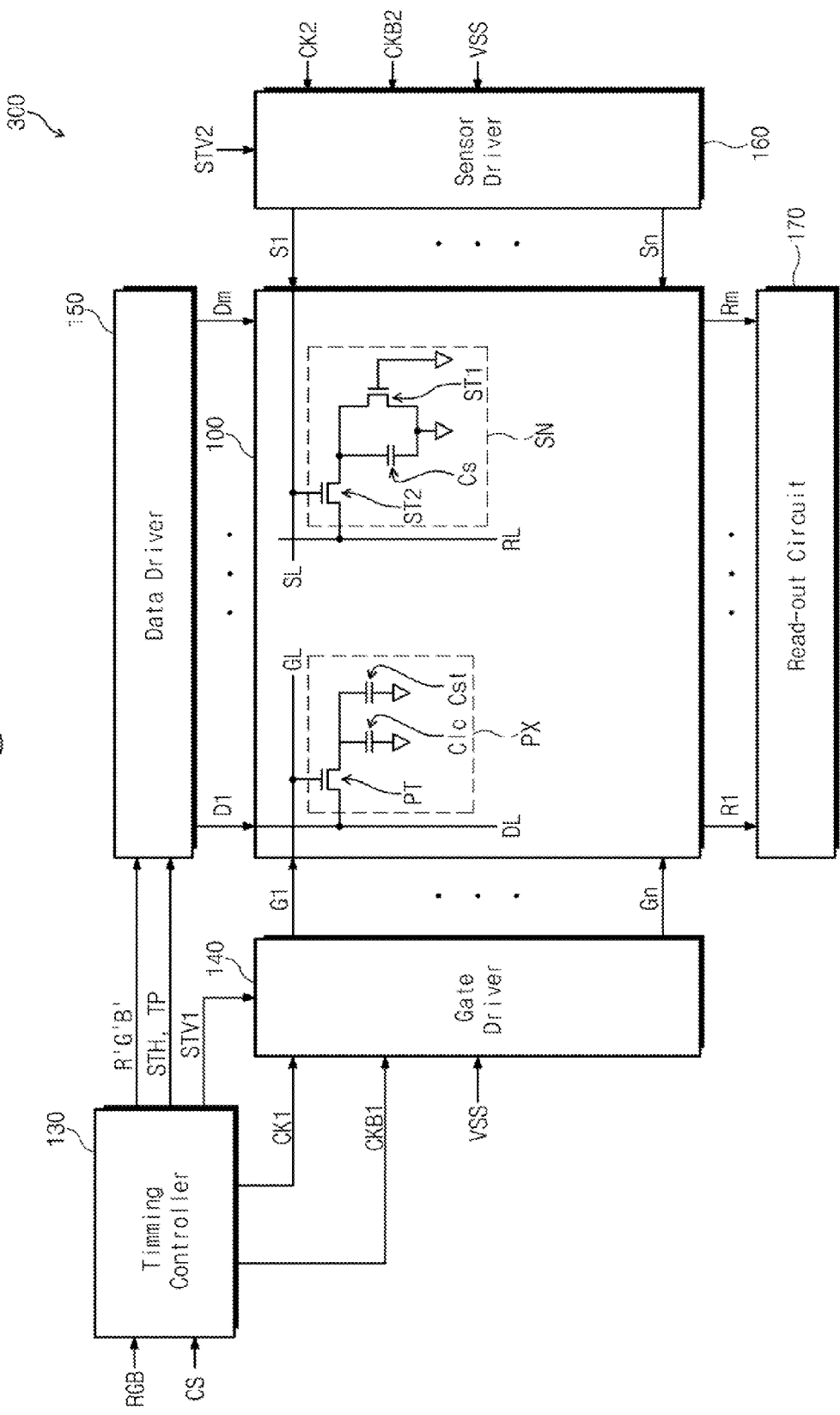
FIG. 3 is a block diagram of the display apparatus of FIG. 1.

FIG. 3 is a block diagram showing the display apparatus of FIG. 1. As shown, the display apparatus 300 includes a timing controller 130, a data driver 150, a gate driver 140, a read-out circuit 170, a sensor driver 160, and the display panel 100.

The timing controller 130 receives a plurality of image signals RGB and a plurality of control signals CS from a device outside the display apparatus 300. The timing controller 130 converts the data format of the image signals RGB to make them suitable for interface requirements with the data driver 150, and provides the converted image signals R'G'B' to the data driver 150. In addition, the timing controller 130 provides data control signals (e.g., an output starting signal TP, a horizontal starting signal STH, etc.) to the data driver 150. The timing controller 130 provides gate control signals (e.g., a vertical starting signal STV1, a vertical clock signal CK1, and a vertical clock bar signal CKB1) to the gate driver 140.

The gate driver 140 sequentially outputs gate signals G1 to Gn in response to the gate control signals (the vertical starting signal STV1, the vertical clock signal CK1, and the vertical clock bar signal CKB1) from the timing controller 130.

The data driver 150 converts the image signals R'G'B' into data voltages D1 to Dm in response to the data control signals (the output starting signal TP and the horizontal starting signal STH) from the timing controller 130 and outputs the data voltages D1 to Dm. The data voltages D1 to Dm are applied to the display panel 100.

The display panel 100 includes a plurality of pixels PX and a plurality of sensors SN. The pixels PX and the sensors SN are embedded in the display panel 100. In some embodiments, the pixels PX are provided in the lower substrate 110, and the sensors SN are provided in the upper substrate 120.

Structure of an Exemplary Pixel PX

The lower substrate 110 (shown in FIG. 2) includes a plurality of gate lines GL and a plurality of data lines DL crossing the gate lines GL to form the pixels PX. Each pixel PX includes a thin film transistor PT, the liquid crystal capacitor Clc, and a storage capacitor Cst. The thin film transistor PT includes a gate electrode connected with a gate line corresponding thereto from among the gate lines GL, a source electrode connected with a data line corresponding thereto from among the data lines DL, and a drain electrode connected with the liquid crystal capacitor Clc and the storage capacitor Cst.

The gate lines GL are connected with the gate driver 140, and the data lines DL are connected with the data driver 150. The gate lines GL receive the gate signals G1 to Gn from the gate driver 140, and the data lines DL receive the data voltages D1 to Dm from the data driver 150. The thin film transistor PT is turned on in response to a gate signal supplied to the corresponding gate line, and the liquid crystal capacitor Clc is charged with a data voltage that has been supplied to the corresponding data line through the thin film transistor PT. Accordingly, each pixel PX may display an image corresponding to the data voltage.

Structure of an Exemplary Sensor

The upper substrate 120 includes a plurality of scan lines SL, a plurality of read-out lines RL crossing the scan lines SL, and the sensors SN. Each sensor SN includes the sensing transistor ST1, a switching transistor ST2, and a capacitor Cs. The switching transistor ST2 includes a first electrode connected with a scan line corresponding thereto from among the scan lines SL, a second electrode connected with a read-out line corresponding thereto from among the read-out lines RL, and a third electrode connected with the capacitor Cs and the sensing transistor ST1.

The capacitor Cs has a first electrode connected with the third terminal of the switching transistor ST2 and a second electrode receiving a ground voltage. The sensing transistor ST1 includes a first terminal connected with the third terminal of the switching transistor ST2, a second terminal receiving a bias voltage, and a third terminal that is also connected with the second electrode of the capacitor Cs and ground.

The sensing transistor ST1 senses the infrared ray L2 reflected from the object 10 and outputs a signal corresponding to the amount of the reflected infrared ray L2. The amount of charge on the capacitor Cs changes according to the signal output from the sensing transistor ST1. In other words, as the amount of the reflected infrared ray L2 increases, the amount of charge on the capacitor Cs also increases.

The scan lines SL are connected with the sensor driver 160 to sequentially receive a plurality of scan signals S1 to Sn, respectively. The sensor driver 160 receives sensor control signals STV2, CK2, and CKB2 from the timing controller 130 to output the scan signals S1 to Sn. The sensor control signals STV2, CK2, and CKB2 may be synchronized with the gate control signals (the vertical starting signal STV1, the vertical clock signal CK1, and the vertical clock bar signal CKB1).

Each read-out line RL is connected with the read-out circuit 170 to supply the charged voltage of the sensor SN corresponding to each read-out line RL to the read-out circuit 170.

When the switching transistor ST2 is turned on in response to a scan signal corresponding thereto, the sensor SN supplies a charged voltage from the capacitor Cs to the read-out line RL corresponding to the sensor SN. When an object 10 is sensed, the sensing transistor closes, allowing the charge to come out of the capacitor Cs. This drop in the charge on the capacitor Cs is detected when the switching transistor ST2 is turned on, indicating the presence of an object 10.

Accordingly, the read-out circuit 170 supplies a voltage received from the sensor SN to the timing controller 130. The timing controller 130 may create two-dimensional coordinates of a point touched by the object 10 based on a time at which the scan signal is generated and the read-out voltage.

Figure 4:
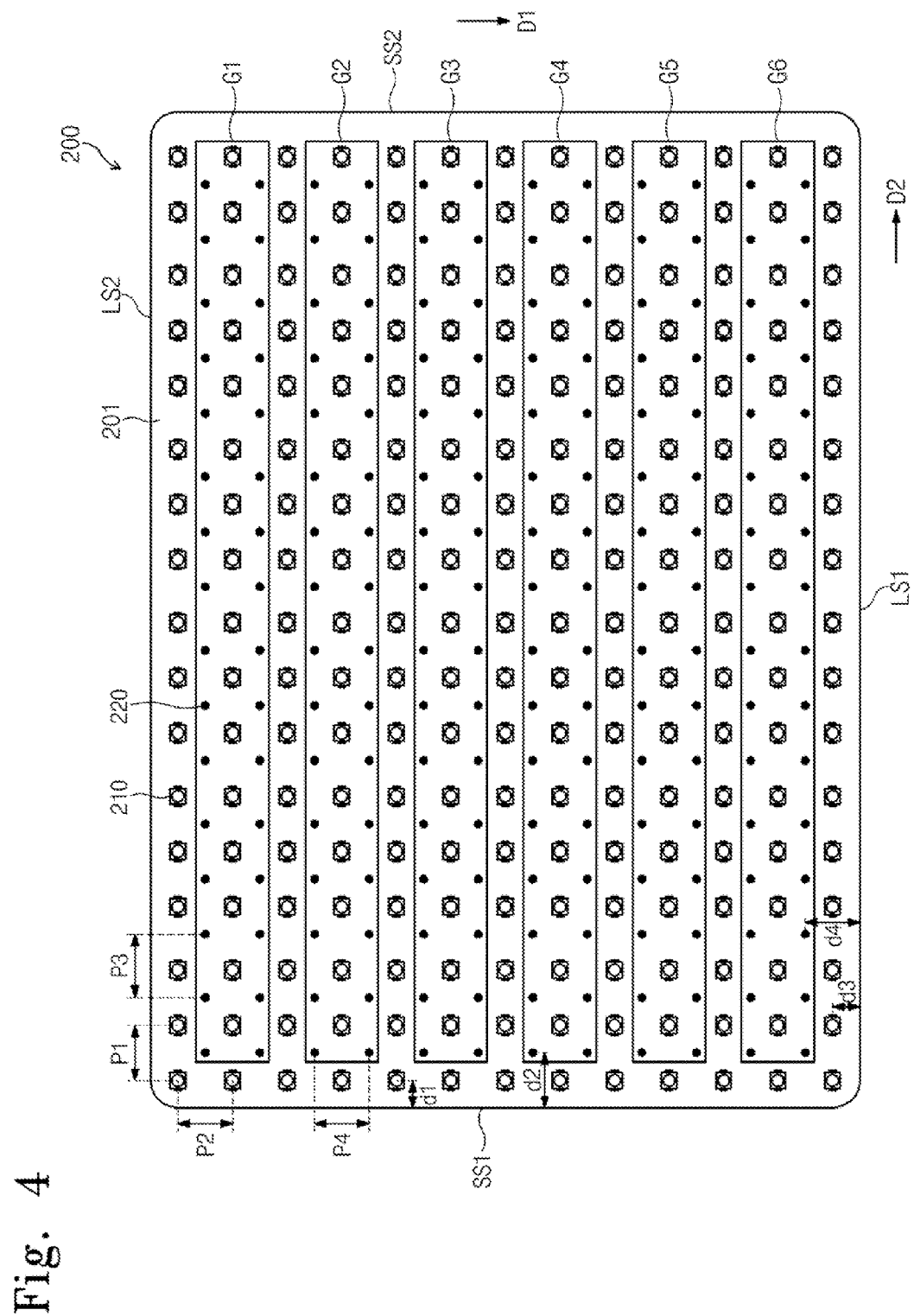
FIG. 4 is a plan view of one embodiment of the backlight unit.

FIG. 4 is a plan view of a backlight unit. As shown, the backlight unit 200 includes the circuit substrate 201, the light sources 210 mounted on the circuit substrate 201 to output white light L1 (shown in FIG. 2), and the radiation sources 220 mounted on the circuit substrate 201 to output the infrared ray L2 (shown in FIG. 2). The light sources 210 are arranged in a matrix, and the radiation sources 220 are arranged in a matrix at positions different from those of the light sources 210. The arrangement of the radiation sources 220 are not limited thereto, but may vary according to a total number of the radiation sources 220.

In the embodiment of FIG. 4, the number of the radiation sources 220 provided in the backlight unit 200 is approximately equal to the number of the light sources 210. In this particular embodiment, a first interval P1 between two first light sources 210 adjacent to each other in a row direction D2 is set to about 27 mm, and a second interval P2 between two first light sources 210 adjacent to each other in a first direction D1 is set to about 27 mm. A third interval P3 between two radiation sources 220 adjacent to each other in the row direction D2 is set to about 27 mm, and a fourth interval P4 between two radiation sources 220 adjacent to each other in the first direction D1 is set to about 27 mm. If the number of the radiation sources 220 is reduced, the third and fourth intervals P3 and P4 may increase.

Figure 5:
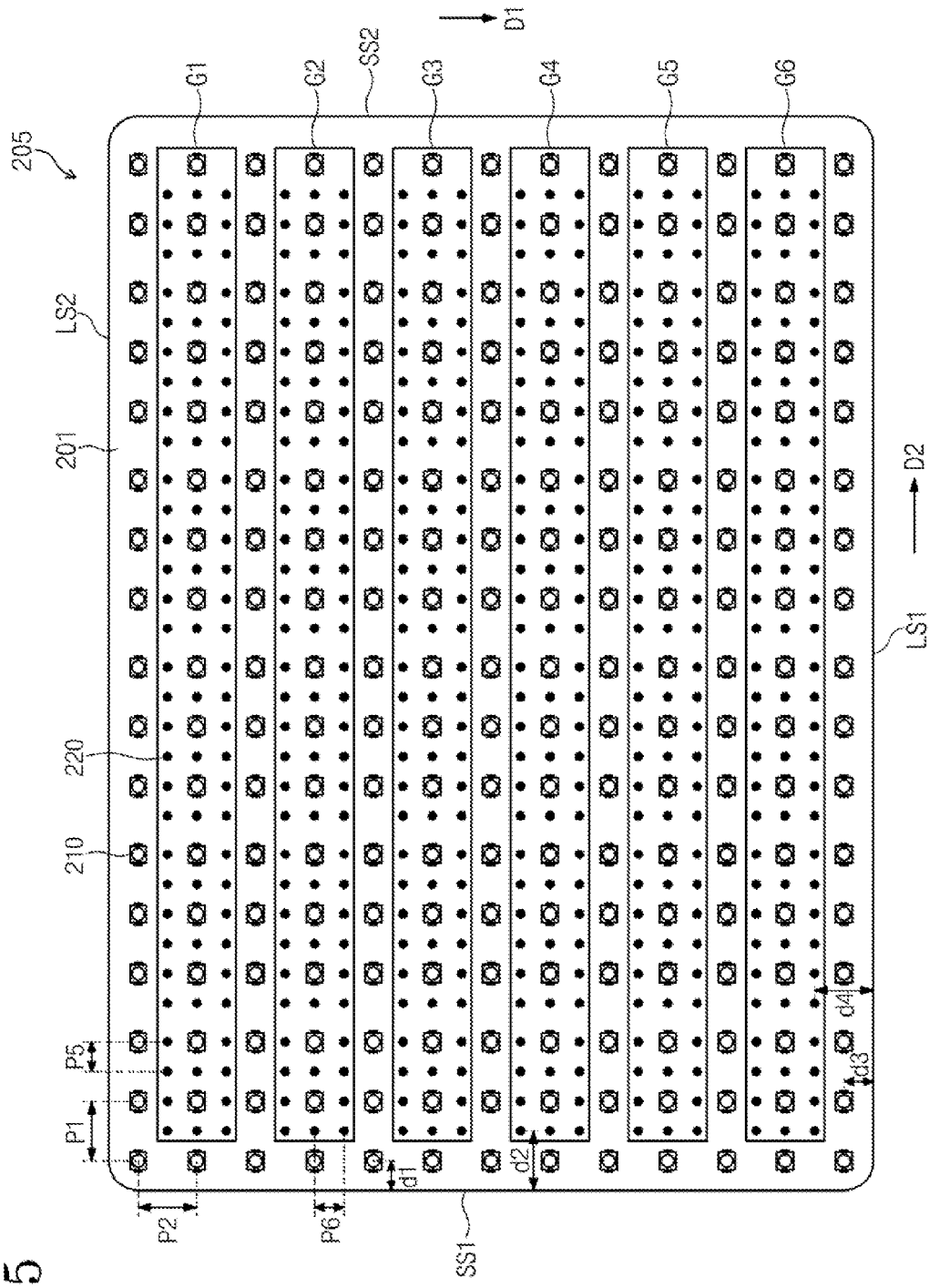
FIG. 5 is a plan view of another embodiment of the backlight unit.

FIG. 5 is a plan view showing a backlight unit according to another exemplary embodiment of the invention. As shown, a backlight unit 205 includes about twice as many radiation sources 220 as light sources 210 in this embodiment. The first interval P1 between two light sources 210 adjacent to each other in the row direction D2 is set to about 27 mm, and the second interval P2 between two first light sources 210 adjacent to each other in the first direction D1 is set to about 27 mm. A fifth interval P5 between two radiation sources 220 adjacent to each other in the row direction D2 is set to about 20 mm, and a sixth interval P6 between two radiation sources 220 adjacent to each other in the first direction D1 is set to about 19 mm.

In both embodiments of FIGS. 4 and 5, since the radiation sources 220 are not used for image display, they are disposed primarily on the inner region of the circuit substrate 201 unlike the light sources 210, which are distributed evenly across the backlight unit 200. A distance d1 between a first edge SS1 of the circuit substrate 201 and the light sources 210 closest to the first edge SS1 is set to a value of about 10 mm to about 13 mm, and a distance d2 between the first edge SS1 and the radiation sources 220 closest to the first edge SS1 is set to about 30 mm. The first edge SS1 may be a short side of a rectangular substrate. In addition, distances between a second edge SS2 parallel to the first edge SS1 and the light sources 210 and radiation sources 220 are set similarly to the distances d1 and d2 between the first edge SS1 and the light sources 210 and radiation sources 220, respectively.

A distance d3 between a third edge LS1 of the circuit substrate 210 and the light sources 210 closest to the third edge LS1 is set to about 13 mm, and a distance d4 between the third edge LS1 and the radiation sources 220 closest to the third edge LS1 is set to about 27 mm. The third edge LS1 may be a long side of a rectangular substrate. In addition, distances between a fourth edge LS2 parallel to the third edge LS1 and the light and radiation sources 210 and 220 are set similarly to the distances d3 and d4 between the third edge LS1 and the light and radiation sources 210 and 220.

Meanwhile, the backlight unit 200 and 205 is classified into p groups (hereinafter, referred to as a first group G1 to a sixth group G6) arranged in the first direction D1. The first direction D1 is also the direction in which the scan lines SL of the sensors are arranged (see FIG. 3). "p" is a natural number greater than or equal to 2, and each of the first to sixth groups G1 to G6 includes the radiation sources 220. The first to sixth groups G1 to G6 may include the same number of the radiation sources 220. According to an exemplary embodiment of the present invention, each of the first to sixth groups G1 to G6 may include 192 radiation sources 220. Although the first to sixth groups G1 to G6 are shown in FIG. 4, the invention is not limited to any specific number of groups.

The first to sixth groups G1 to G6 may be turned on for different durations from each other. The turn-on durations of the first to sixth groups G1 to G6 will be described in detail with reference to FIGS. 5 to 6.

Figure 6:
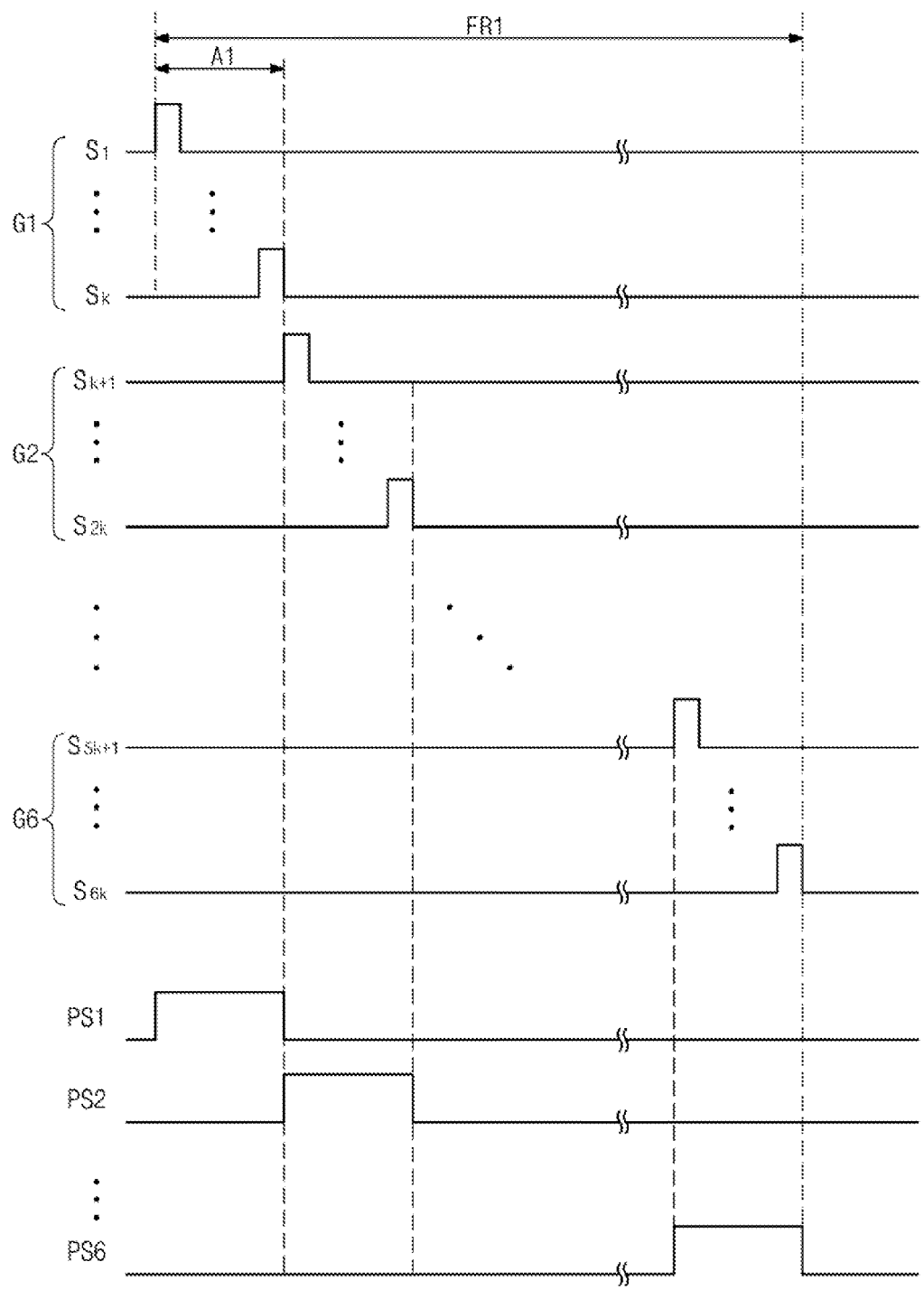
FIG. 6 is a timing diagram showing the synchronization between the scan signals to a sensing circuit and activation of radiation sources.

FIG. 6 is a timing diagram showing turn-on time of the first to sixth groups shown in FIG. 4 and how the scan signals to the sensor are synchronized with pulse width modulation (PWM) signals to radiation sources 220.

Referring to FIG. 6, the first to sixth groups receives a first PWM signal PS1 to a sixth PWM signal PS6, respectively. The first to sixth PWM signals PS1 to PS6 are sequentially generated during one frame period FR1. For example, a high duration of each of the first to sixth PWM signals PS1 to PS6 is defined as a first time period A1.

The display panel 100 may include k scan lines SL (see FIG. 3) corresponding to each of the first to sixth groups G1 to G6. In other words, the display panel 100 includes n scan lines in total (n=pk). If the n scan lines are divided by 6 corresponding to the first to sixth groups G1 to G6, k (n/6) scan lines may correspond to each of the first to sixth groups G1 to G6. The first time period A1 may be defined as a value obtained by dividing the one frame period FR1, which is defined as a unit for image display in the display panel 100, by the number of the groups (p=6). When the display panel 100 is driven at a frequency of 60 Hz, the frame period FR1 is set to about 16.3 ms. In this case, the first time period A1 may be set to about 2.7 ms.

The 6 k scan signals $S_1$ to $S_k$, $S_{k+1}$ to $S_{2k}$, ..., and $S_{5k+1}$ to $S_{6k}$ are sequentially applied to 6 k (6 k=n) scan lines provided in the display panel 100. Each of the 6 k scan signals $S_1$ to $S_k$, $S_{k+1}$ to $S_{2k}$, ..., and $S_{5+1}$ to $S_{6k}$ is generated at a high state for one horizontal scanning period (1 H period). In this case, the high duration of each of the scan signals $S_1$ to $S_k$ may be defined as turn-on duration of each scan line SL.

The k scan signals $S_1$ to $S_k$, $S_{k+1}$ to $S_{2k}$, ..., or $S_{5k+1}$ to $S_{6k}$ are sequentially applied to the k scan lines corresponding to each of the first to sixth groups G1 to G6 during the first time period A1. For example, k scan signals $S_1$ to $S_k$ are sequentially applied to k scan lines corresponding to the first group G1 during the first time period A1.

Each of the first to sixth groups G1 to G6 may be turned on for the first time period A1 in which the scan signals $S_1$ to $S_k$, $S_{k+1}$ to $S_{2k}$, ..., or $S_{5k+1}$ to $S_{6k}$ are applied to the scan lines corresponding to each of the first to sixth groups G1 to G6. In other words, the radiation sources 220 included in the first group G1 may be consecutively turned on from a rising edge of a first scan signal S1, which is applied to a first scan line from among the k scan lines in the first group G1, to the falling edge of a last scan signal $S_k$ which is applied to a last scan line among the k scan lines in the first group G1. When the first time period A1 elapses after the first group G1 is turned on, the first group G1 is turned off and the second group G2 is turned on during the next first time period A1. This procedure is repeated so that the first to sixth groups G1 to G6 may be turned on at different times. As shown in FIG. 6, the first to sixth groups G1 to G6 may be sequentially turned on in the first direction D1. In this case, the turn-on durations of the first to sixth groups G1 to G6 do not overlap with each other.

When the turn-on duration of each of the first to sixth groups G1 to G6 is reduced to the first period A1, power consumption in the backlight unit 200 may be reduced to about ⅙ as compared with power consumption when the first to sixth groups G1 to G6 are turned on throughout the one frame period FR1.

The length of the turn-on duration of each of the first to sixth groups G1 to G6 may be adjusted according to the characteristics of the sensing transistor ST1 (shown in FIG. 3) provided in the each sensor SN. Since the time (charge time) required to charge the sense signal of the sensing transistor ST2 and the capacitor Cs (shown in FIG. 3) corresponds to several micro-seconds, even if the turn-on duration of each of the first to sixth groups G1 to G6 is reduced to about 2.7 ms, the sensors SN may normally sense the infrared ray L2.

In the embodiment of FIG. 6, by dividing the radiation sources 220 into 6 groups (p=6) and turning on the six blocks sequentially throughout one frame period FR1, power consumption can be lowered to about ⅙ of what it would have been if all the radiation sources were continually turned on.

Figure 7:
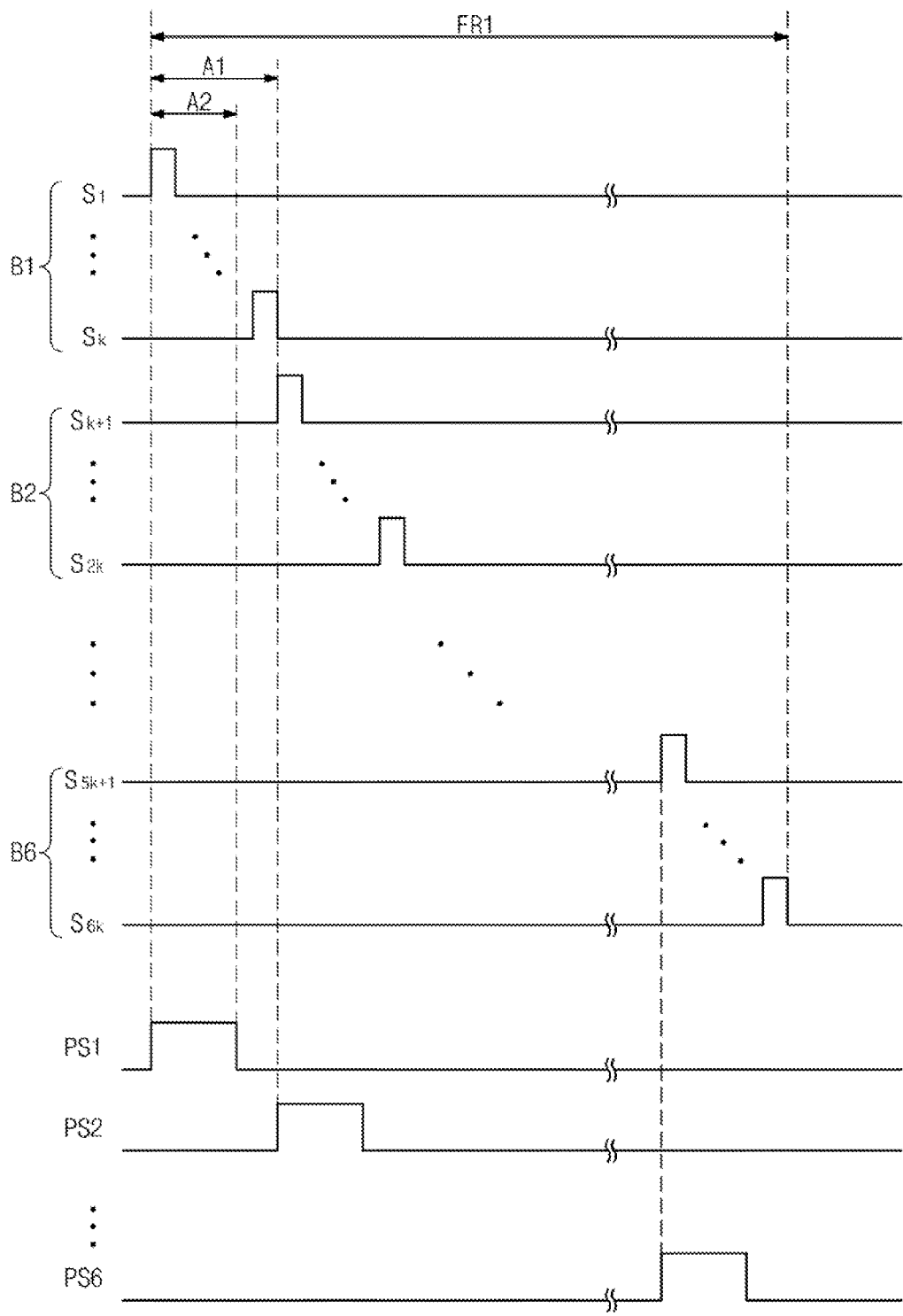
FIG. 7 is a timing diagram showing the turn-on duration of radiation sources when a driving current is increased.

FIG. 7 is a timing diagram showing the turn-on duration of the first to sixth groups when a driving current supplied to the radiation sources of FIG. 4 is increased.

Referring to FIG. 7, if a driving current supplied to the radiation sources 220 included in each of the first to sixth groups G1 to G6 is increased, the high duration of each of the first to sixth PWM signals PS1 to PS6 may become shorter than the first time period A1 (where A1=FR1/p).

For example, if the driving current supplied to the radiation sources 220 when the high duration of each of the first to sixth PWM signals PS1 to PS6 is set to the first period A1 as shown in FIG. 6 were 50 mA, increasing the driving current supplied to the radiation sources 220 to 80 mA allows each of the first to sixth PWM signals PS1 to PS6 to have the high duration of a second time period A2 shorter than the first time period A1 without lowering the intensity on the infrared ray L2. According to one exemplary embodiment of the present invention, the second time period A2 may be about 1.6 ms. Even if the turn-on duration is reduced as described above, the first to sixth groups G1 to G6 may output the infrared ray L2 having a same intensity as the intensity of the infrared ray L2 output from the backlight unit 200 corresponding to the exemplary embodiment of FIG. 6.

Alternatively, when the turn-on duration of each of the first to sixth groups G1 to G6 is set to the first period A1 as shown in FIG. 6, and the driving current applied to the radiation sources 220 is increased to 80 mA from 50 mA, fewer radiation sources 220 may be included in the backlight unit 200 without sacrificing the accuracy of the object-sensing capability.

Although the backlight unit 200 corresponding to the embodiment of FIG. 6 includes 432 light sources 210 and 1152 radiation sources 220, the number of the radiation sources 200 included in the backlight unit 200 may be reduced when the driving current applied to the radiation sources 220 is increased or a duty ratio of the first to sixth groups G1 to G6 is increased.

To reduce the number of the radiation sources 220 included in the backlight unit 200, if the duty ratio of each of the first to sixth groups G1 to G6 is increased, the turn-on durations of each of the first to sixth groups G1 to G6 may partially overlap with each other. Alternatively, if the amplitude of the current supplied to the radiation sources 220 is decreased to below 50 mA, each group may have to stay turned on for longer than the first duration A1, causing the turn-on durations of each of the groups G1 to G6 to overlap.

Figure 8:
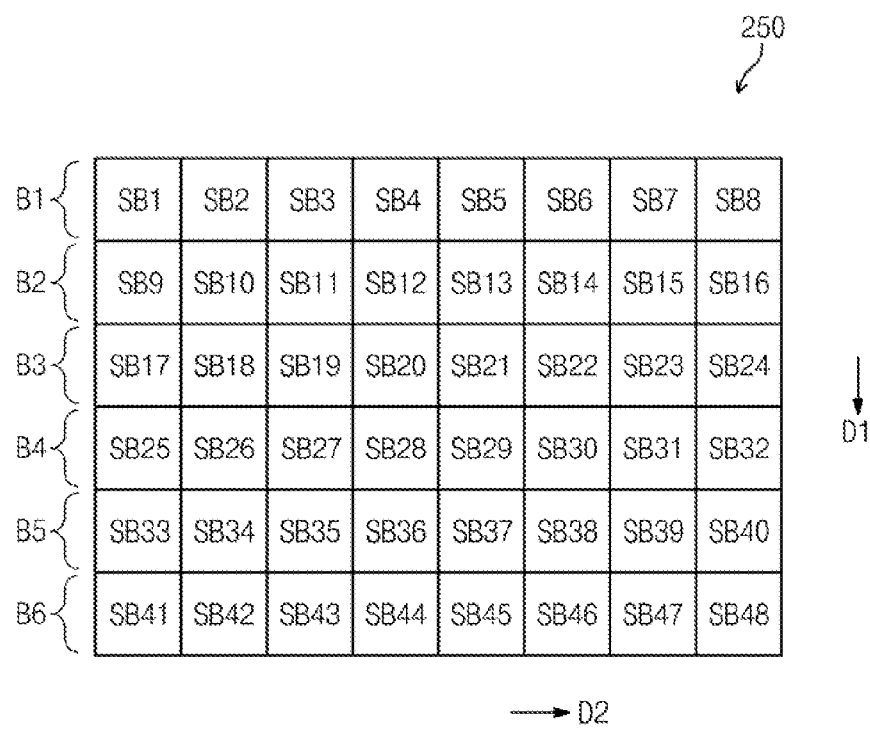
FIG. 8 is a plan view showing a backlight unit according to another exemplary embodiment of the present invention.

FIG. 8 is a plan view showing a backlight unit according to another embodiment of the invention. As shown, a backlight unit 250 is partitioned into the first to sixth groups G1 to G6 in the first direction D1. Each of the first to sixth groups G1 to G6 includes m (m is a natural number greater than or equal to 2) sub-groups (e.g., SG1 to SG8, SG9 to SG16, . . . , or SG41 to SG48) partitioned in the second direction D2. Each of the sub-groups SG1 to SG8, SG9 to SG16, . . . , and SG41 to SG48 includes the radiation sources 220. Each of the first to sixth groups G1 to G6 includes a same number of the radiation sources 220, and even each of the sub-groups SG1 to SG8, SG9 to SG16 . . . , and SG41 to SG48 includes a same number of the radiation sources 220. According to an embodiment of the present invention, each of the sub-groups SG1 to SG8, SG9 to SG16, . . . , and SG41 to SG48 may include 24 radiation sources 220. Although FIG. 4 shows 6 groups G1 to G6 and 48 sub-groups SG1 to SG8, SG9 to SG16 . . . , and SG41 to SG48, the present invention is not limited to any specific number of sub-groups.

The first to sixth groups G1 to G6 are sequentially turned on in the first direction D1, and the sub-groups SG1 to SG8, SG9 to SG16, . . . , and SG41 to SG48 included in each of the first to sixth groups G1 to G6 are sequentially turned on in the second direction D2. The turn-on duration of each of the sub-groups SG1 to SG8, SG9 to SG16, . . . , and SG41 to SG48 will be described in detail with reference to FIG. 9.

Figure 9B:
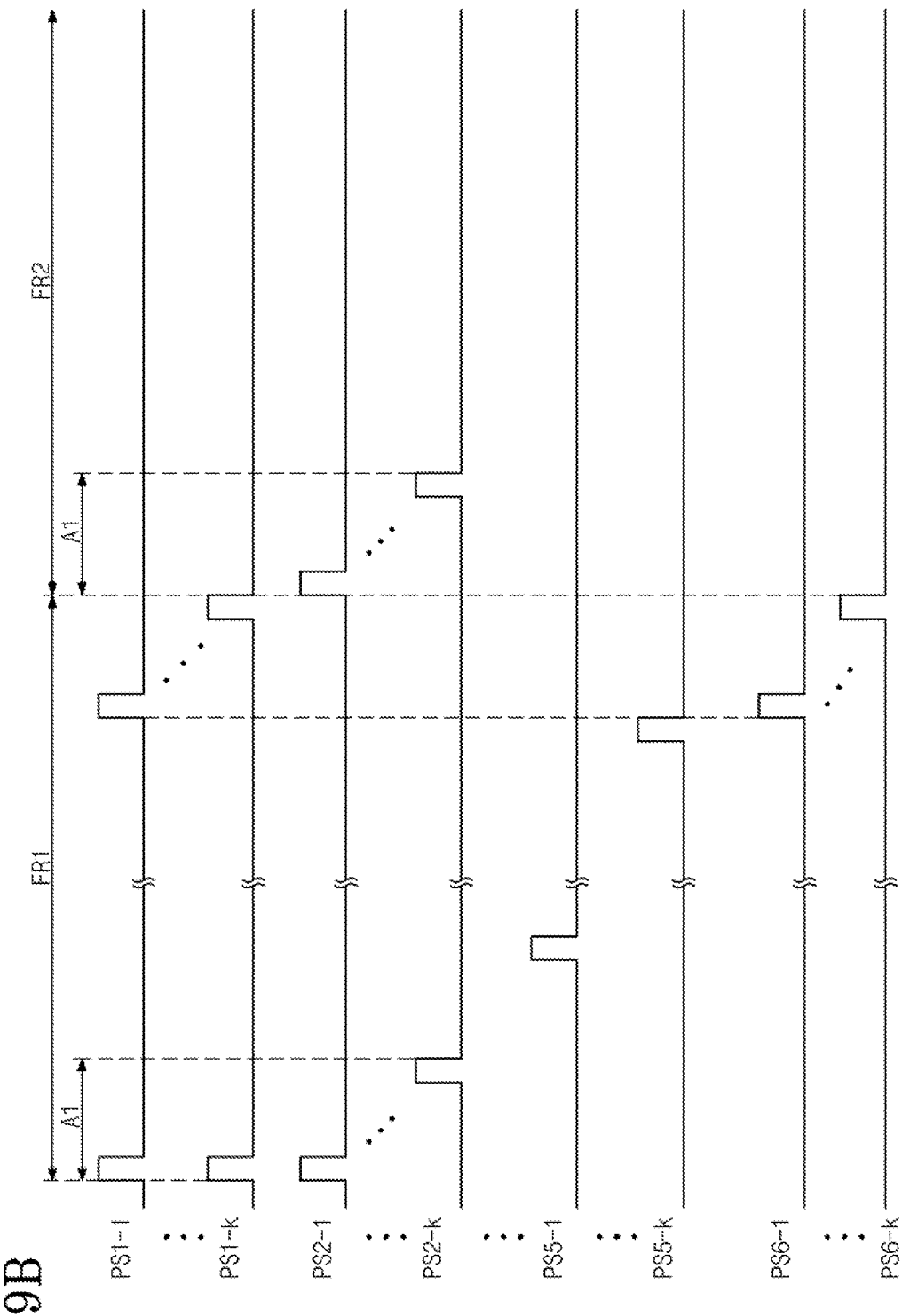
FIG. 9B is a timing diagram showing sub-PWM signals applied to the sub-groups of FIG. 8.

FIG. 9A is a timing diagram showing scan signals applied to scan lines SL corresponding to each of the first to sixth groups shown in FIG. 8, and FIG. 9B is a timing diagram showing sub-PWM signals applied to the sub-groups of FIG. 8. As shown, the display panel 100 includes k scan lines in each of the first to sixth groups G1 to G6. Accordingly, 6 k scan signals $S_1$ to $S_k$, $S_{k+1}$ to $S_{2k}$, . . . , and $S_{5k+1}$ to $S_{6k}$ are sequentially applied to 6 k (6 k=n) scan lines provided in the display panel 100. Each of the 6 k scan signals $S_1$ to $S_k$, $S_{k+1}$ to $S_{2k}$, . . . , and $S_{5k+1}$ to $S_{6k}$ is generated at a high state for one horizontal scanning period (1 H period).

The time required to sequentially apply k scan signals $S_1$ to $S_k$, $S_{k+1}$ to $S_{2k}$, . . . , or $S_{5k+1}$ to $S_{6k}$ to the k scan lines corresponding to each of the first to sixth groups G1 to G6 may be defined as the first time period A1.

The first to sixth groups G1 to G6 are sequentially turned on in the first direction D1 for each frame period FR1 or FR2. In addition, the sub-groups SG1 to SG48 included in each of the first to sixth groups G1 to G6 are sequentially turned on in the second direction D2.

As shown in FIG. 9B, the k sub-groups SG1 to SG 48 included in each of the first to sixth groups G1 to G6 sequentially receive k sub-PWM signals PS1-1 to PS6-$k$. In particular, the k sub-PWM signals PS1-1 to PS6-$k$ are sequentially generated at a high state for the first time period A1. In an exemplary embodiment of the present invention, a first sub-PWM signal PS1-1 to an eight sub-PWM signal PS1-$k$ respectively applied to a first sub-group SG1 to an eight sub-group SG8 are simultaneously generated at a high state for a third time period A3 within a first frame FR1.

A first sub-group SG1 to an eighth sub-group SG8 included in the first group G1 are simultaneously turned on for the third time period A3 in the first frame period FR1 in response to the first to eight sub-PWM signal PS1-1 to PS1-$k$ to ensure that the capacitor Cs will get sufficient charging time. (A3=FR1/pm) The first to eighth sub-groups SG1 to SG8 of the first group G1 are turned on for the third time period A3 shorter than the first time period A1. According to an exemplary embodiment of the present invention, even if the third time period A3 may be set as a duration from the rising edge of a first scan signal S1 to a time point in which about 0.3 ms has elapsed from the rising time point, the third time period A3 may be adjusted within a time duration shorter than or equal to the first time period A1.

The sub-groups SG9 to SG48 included in each of the second to sixth groups G2 to G6 are sequentially turned on for each frame period FR1 or FR2. Particularly, the sub-blocks SG9 to SG48 included in each of the second to sixth groups G2 to G6 are sequentially turned on in each group unit for a duration ranging from the rising edge of a first scan signal applied to a first scan line of a previous group to the falling edge of a last scan signal applied to a last scan line of the previous group.

In detail, a ninth sub-group SG9 from among the sub-groups SG9 to SG16 of the second group G2 is turned on for a fourth time period A4 from the rising edge of the first scan signal $S_1$ applied to the first scan line from among the scan lines corresponding to the previous group (i.e., the first group B1). This is to precharge the capacitor Cs by the switching transistor ST2 for a short time. Next, a tenth sub-group SG10 to a sixteenth sub-group SB16 are sequentially turned on in each group unit for the fourth time period A4 until the falling time point of the last scan signal $S_k$ applied to the last scan line from among the scan lines corresponding to the first group B1.

The fourth time period A4 may be set to a value obtained by dividing the first time period A1 by m. According to one exemplary embodiment of the present invention, since the first time period A1 is set to 2.7 ms and m is 8, the fourth time period A4 may be set to about 0.3 ms.

The forty-first sub-group SG41 from among the sub-groups SG41 to SG48 of the sixth group G6 is turned on for the fourth time period A4 from the rising edge of the first scan signal $S_{4k+1}$ applied to the first scan line from among the scan lines corresponding to a previous group (i.e., the fifth group G5). Thereafter, a forty-second sub-group SG42 to a forty-eighth sub-group SG48 are sequentially turned on in each group unit for the fourth time period A4 until the falling edge of the last scan signal $S_{5K}$ applied to the last scan line from among the scan lines corresponding to the fifth group G5.

Similarly, the ninth to forty-eighth sub-groups SG9 to SG48 of the second to sixth groups G2 to G6 can be sequentially turned on for the first frame period FR1.

When the turn-on duration of each of the first to forty-eighth sub-groups SG1 to SG48 is reduced to the third time period A3 or the fourth time period A4, power consumption may be reduced to about ⅛ as compared with power consumption when each of the first to forty-eighth sub-groups SG1 to SG48 is continuously turned on throughout one frame period FR1.

Meanwhile, the first sub-group SG1 of the first group G1 is turned on for the fourth period A4 from the rising edge of the first scan signal $S_{5k+1}$ applied to the first scan line from among the scan lines corresponding to the last group (i.e., the sixth group G6) of a previous frame period (the first frame period FR1) in a second frame period FR2. Next, the second to eighth sub-groups SG2 to SG8 are sequentially turned on in each group unit for the fourth time period A4 until the falling edge of the last scan signal $S_{6k}$ applied to the last scan line from among the scan lines corresponding to the sixth group G6.

In other words, after the display apparatus 300 has been powered on, the first to eighth sub-groups SG1 to SG8 of the first group G1 are simultaneously turned on only in the first frame period FR1, and sequentially turned on in the next frame period FR2.

Figure 10A:
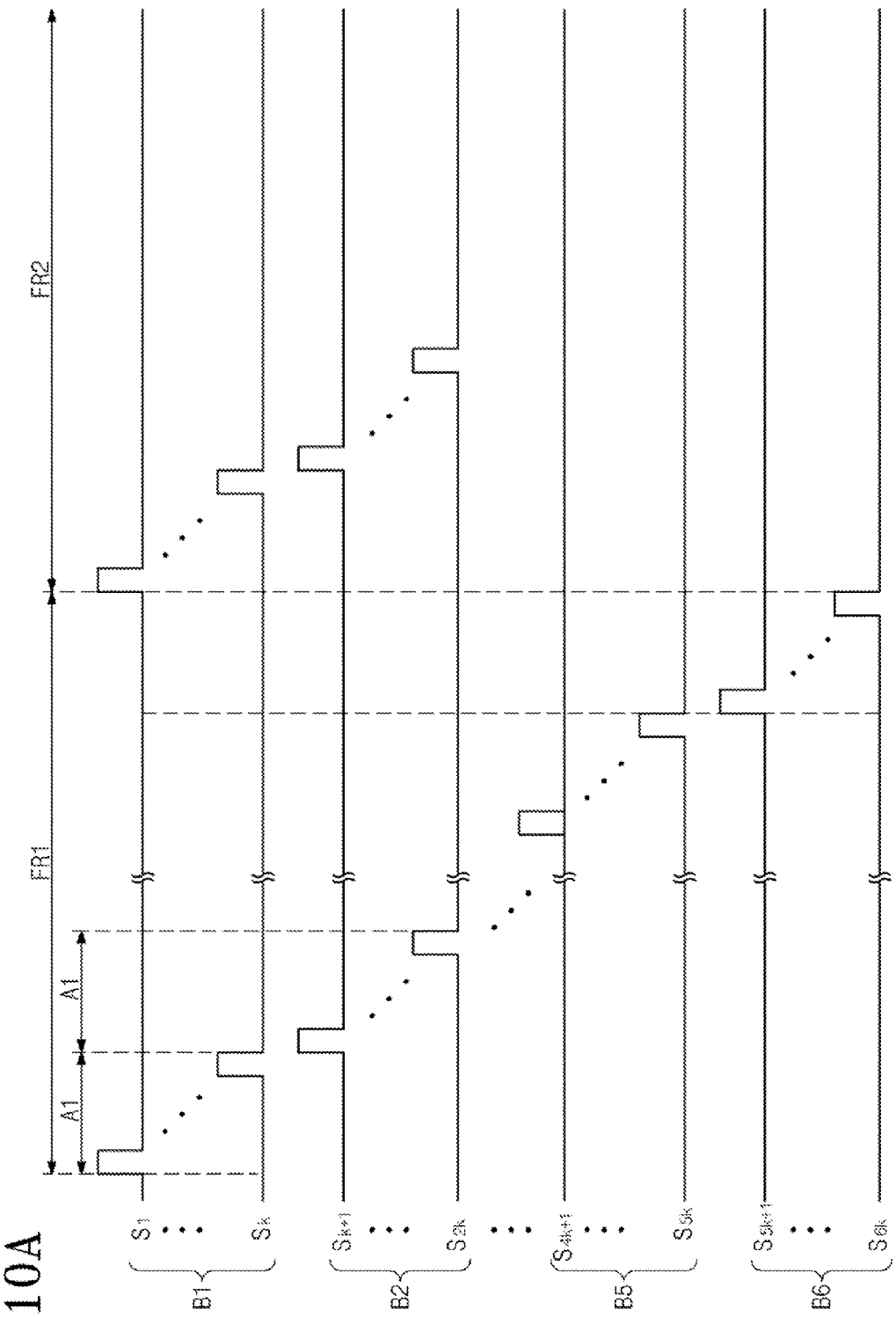
FIG. 10A is a timing diagram showing the synchronization between the scan signals to a sensing circuit and activation of sub-groups of radiation sources according to another embodiment of the invention.
Figure 10B:
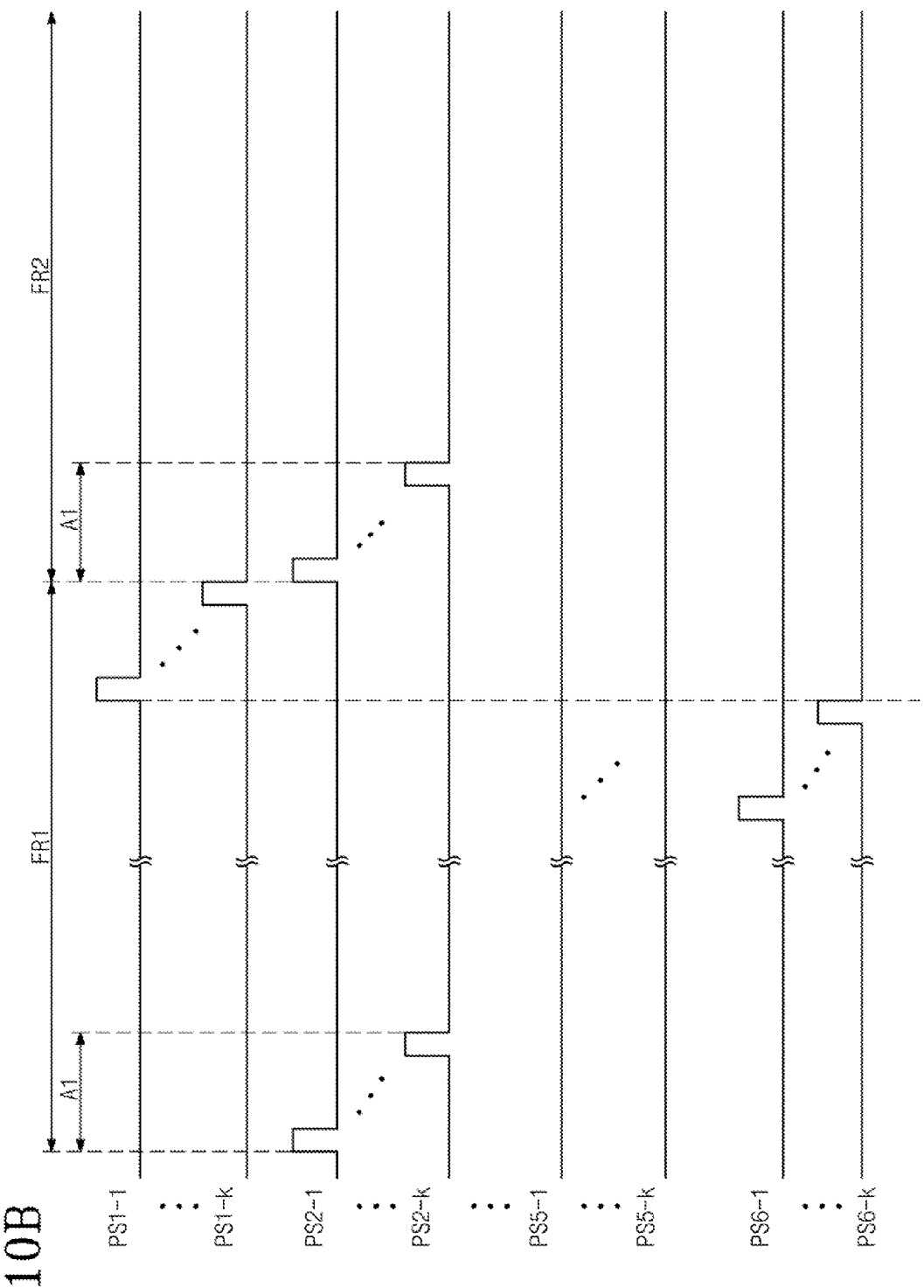
FIG. 10B is a timing diagram showing sun-PWM signals applied to the sub-groups according to another embodiment of the present invention.

FIG. 10A is a timing diagram showing the turn-on duration of sub-groups according to another embodiment of the present invention, and FIG. 10B is a timing diagram showing PWM signals applied to the sub-groups according to another embodiment of the present invention. As shown, after the display apparatus 300 has been powered on, the first to eighth sub-groups SG1 to SG8 of the first group G1 may remain turned off in the first frame period FR1. Thereafter, from the second frame period FR2, the first to eighth sub-groups SG1 to SG8 of the first group G1 may be turned on in synchronization with the scan signals to the scan lines corresponding to the last group B6 of the previous frame.

Although not shown, before the first frame period FR1 starts and after the display apparatus 300 has been powered on, the first to eighth sub-groups SG1 to SG8 of the first group G1 may be sequentially turned on for the first time period A1.

Figure 11:
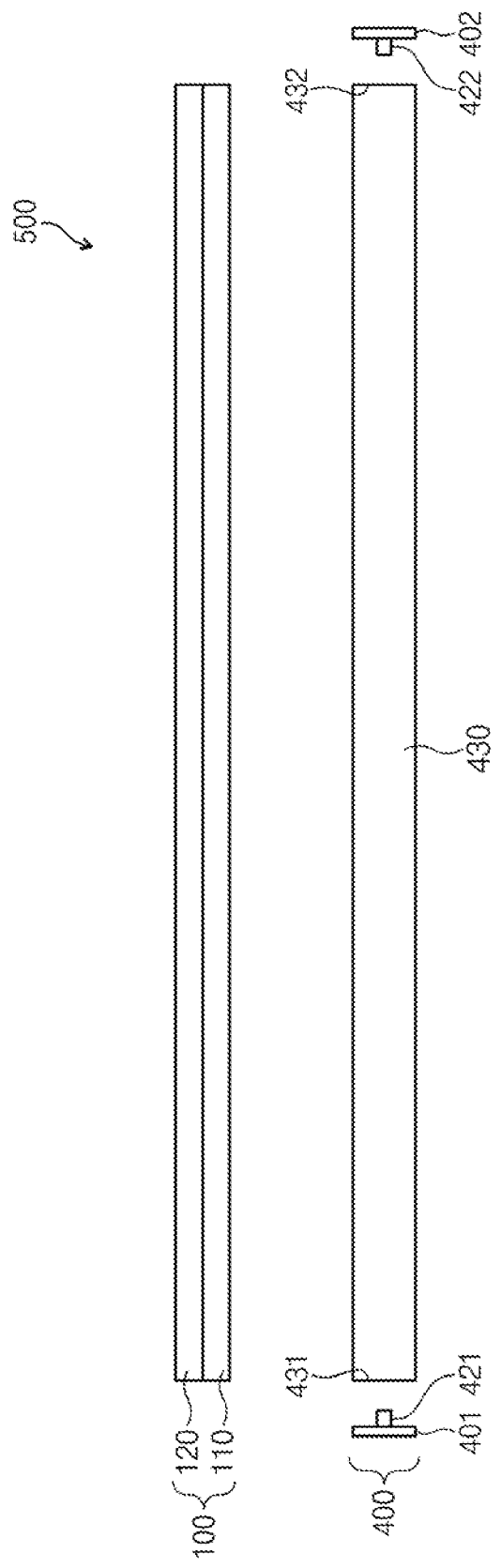
FIG. 11 is a sectional view of a display apparatus according to another embodiment of the present invention.

FIG. 11 is a sectional view showing a display apparatus according to another embodiment of the present invention. Since the liquid crystal display panel 100 of FIG. 11 has substantially the same structure as that of the liquid crystal display panel 100 of FIG. 1, details of the liquid crystal display panel 100 of FIG. 11 will be omitted. FIG. 12 is a plan view showing a backlight unit shown in FIG. 11.

Referring to FIGS. 11 and 12, a display apparatus 500 according to another exemplary embodiment of the present invention includes an edge-type backlight unit 400. The edge-type backlight unit 400 includes a light guide plate 430, a first LED bar 401 and a second LED bar 402. The first and second LED bars 401 and 402 are provided at two opposite sides 431 and 432 of the light guide plate 430, respectively.

The light guide plate 430 is provided below the display panel 100, and the first and second LED bars 401 and 402 are provided at both lateral sides 431 and 432 of the light guide plate 430 facing each other. A plurality of first light sources 411 and a plurality of first radiation sources 421 are mounted on the first LED bar 401, and a plurality of second light sources 412 and a plurality of second radiation sources 422 are mounted on the second LED bar 402. The first and second light sources 411 and 412 include W-LEDs to output white light, and the first and second radiation sources 421 and 422 include IR-LEDs to output infrared ray for object detection.

At least one first radiation source 421 may be interposed between two adjacent first light sources 411 on the first LED bar 401, and at least one second radiation source 422 may be interposed between two adjacent second light sources 412 on the second LED bar 402.

According to an exemplary embodiment of the present invention, the first and second radiation sources 421 and 422 may be classified into p groups (the first to sixth groups G1 to G6) arranged along the first direction D1 in which p is a natural number greater than or equal to 2, and each of the first to sixth groups G1 to G6 includes a same number of the first and second radiation sources 421 and 422.

The first to sixth groups G1 to G6 are turned on at different times even in the edge-type backlight unit 400. Accordingly, the turn-on durations of the first to sixth groups G1 to G6 do not overlap.

The first to sixth groups G1 to G6 are sequentially turned on in the first direction D1. According to an embodiment of the present invention, the first and second radiation sources 421 and 422 of the first to sixth groups G1 to G6 are turned on from the rising edge of the first scan signal applied to the first scan line to the falling edge of the last scan signal applied to the last scan line. The first to sixth groups G1 to G6 are turned on according to a similar method as in the embodiment of FIGS. 6 and 7.

Therefore, the radiation source driving scheme according to the present invention can reduce power consumption.

Although the foregoing invention has been described in some detail by way of illustration and examples for purposes of clarity and understanding, it will be apparent that modifications and alternative embodiments of the invention are contemplated which do not depart from the spirit and scope of the invention as defined by the foregoing teachings and appended claims.

What is claimed is:

1. A method for driving a display device capable of sensing object presence, comprising:
   providing first signals to sensing circuits that detect a presence of an object, the sensing circuits including scan lines for receiving the first signals and sensors for sensing invisible light reflected from the object;
   providing second signals to an invisible light source array that provides invisible light to the sensing circuits, wherein the second signals selectively activate invisible light sources in the invisible light source array;
   synchronizing the timing of the first and second signals so that the invisible light is selectively provided to a portion of the sensing circuits receiving the first signals, and
   dividing the invisible light sources into p groups, and selectively activating the p groups with second signals according to which scan lines are receiving the first signals, wherein each of the p groups is activated for equal to or less than a duration A1 wherein A1=FR1/p and FR1=a frame period,
   wherein the p groups include a first group and a second group and each of the p groups is divided into m subgroups, and
   wherein the m subgroups are simultaneously activated for equal to or less than a duration A3 wherein A3=A1/(m).

2. The method of claim 1, wherein the p groups are activated sequentially one at a time.

3. The method of claim 1, wherein the p groups are arranged in the same direction as the scan lines, the direction being a first direction.

4. The method of claim 3, wherein the m subgroups are arranged along a second direction.

5. The method of claim 1, further comprising precharging the second group while the m subgroups of the first group are simultaneously activated, and sequentially activating the m subgroups of the second group during the precharging.

6. The method of claim 1 further comprising refraining from activating the first group for a first frame after powering on.

7. The method of claim 1, wherein multiple first signals are provided during the duration A1.

8. The method of claim 1, further comprising turning on the p groups of the invisible light sources according to a PWM signal that drives the invisible light sources, and adjusting the turn-on duration according to an amplitude of the PWM signal.

9. The method of claim 1, when each of the p groups is activated for a duration less than A1, there is a temporal gap between successive turn-on durations of different groups.

10. The method of claim 1, wherein turn-on durations partially overlap such that the second signals are simultaneously applied to two groups of the invisible light sources during the overlap.

11. The method of claim 1, wherein at least one of the p groups is activated at any given time in a frame period.

12. The method of claim 1, further comprising periodically activating at least some of the p groups simultaneously.

13. The method of claim 1, wherein each of the p groups includes the same number of the invisible light sources.

14. The method of claim 1, wherein the p groups include varying number of the invisible light sources.

15. The method of claim 1, wherein the first signals are generated at a higher frequency than the second signals.

16. A display device comprising:
a sensor array of sensing circuits, wherein each of the sensing circuits includes a scan line and a sensing transistor that outputs a detection signal when an object is detected and the scan line is receiving a first signal, and wherein the sensing circuits are sequentially activated by a series of first signals; and
a radiation source array coupled to the sensor array and emitting radiation that is used by the sensing transistor to detect the object, wherein radiation sources in the radiation source array are activated by second signals that are synchronized with the first signals,
wherein the radiation sources are divided into p groups that are selectively activated according to which scan lines are receiving the first signals, wherein the p groups include a first group and a second group,
wherein each of the p groups is activated for equal to or less than a duration A1 wherein A1=FR1/p and FR1=a frame period, and
wherein multiple first signals are provided during the duration A1.

17. The device of claim 16, wherein the p groups are activated sequentially one at a time.

18. The device of claim 16, wherein the p groups are arranged in the same direction as the scan lines, the direction being a first direction.

19. The device of claim 18, wherein each of the p groups is further divided into m subgroups along a second direction.

20. The device of claim 19, wherein the subgroups of the first group are activated simultaneously for a duration A3 wherein A3=A1/(m), A1=FR1/p, and FR1=a frame period.

21. The device of claim 20, wherein the second group is precharged through sequential turning-on while the subgroups of the first group are simultaneously turned on.

22. The device of claim 19 wherein the first group is not activated during a first frame after powering on.

23. The device of claim 16, wherein the p groups of radiation sources are turned on according to a PWM signal that drives the radiation sources, further comprising adjusting the turn-on duration according to an amplitude of the PWM signal.

24. The device of claim 16, wherein if each of the p groups is activated for a duration less than A1, there is a temporal gap between successive turn-on durations of different groups.

25. The device of claim 16, wherein turn-on durations partially overlap such that the second signals are simultaneously applied to two groups of radiation sources during the overlap.

26. The device of claim 16, wherein at least some of the p groups are simultaneously activated periodically.

27. The device of claim 16, wherein each of the p groups includes the same number of radiation sources.

28. The device of claim 16, wherein the p groups include varying number of radiation sources.

29. The device of claim 16, wherein the first signals are generated at a higher frequency than the second signals.

30. The device of claim 16, wherein the radiation sources are infrared LEDs.

31. The device of claim 16, wherein the radiation sources are infrared LEDs and white LEDs.

32. The device of claim 16 further comprising:
a display panel for displaying images; and
a light source array for providing visible light to the display panel.

33. A display device comprising:
a sensor driver sequentially activating scan lines of a sensor array that senses the presence of an object;
a radiation source array emitting radiation that is used by the sensor array to detect the presence of an object; and
a backlight driver selectively activating portions of the radiation source array according to which scan lines are being activated,
wherein the radiation source array is divided into p groups that are selectively activated according to which scan lines are receiving scan line activate signals,
wherein each of the p groups is activated for equal to or less than a duration A1 wherein A1=FR1/p and FR1=a frame period, and
wherein multiple scan line activate signals are provided during the duration A1.

* * * * *